Figure 1:
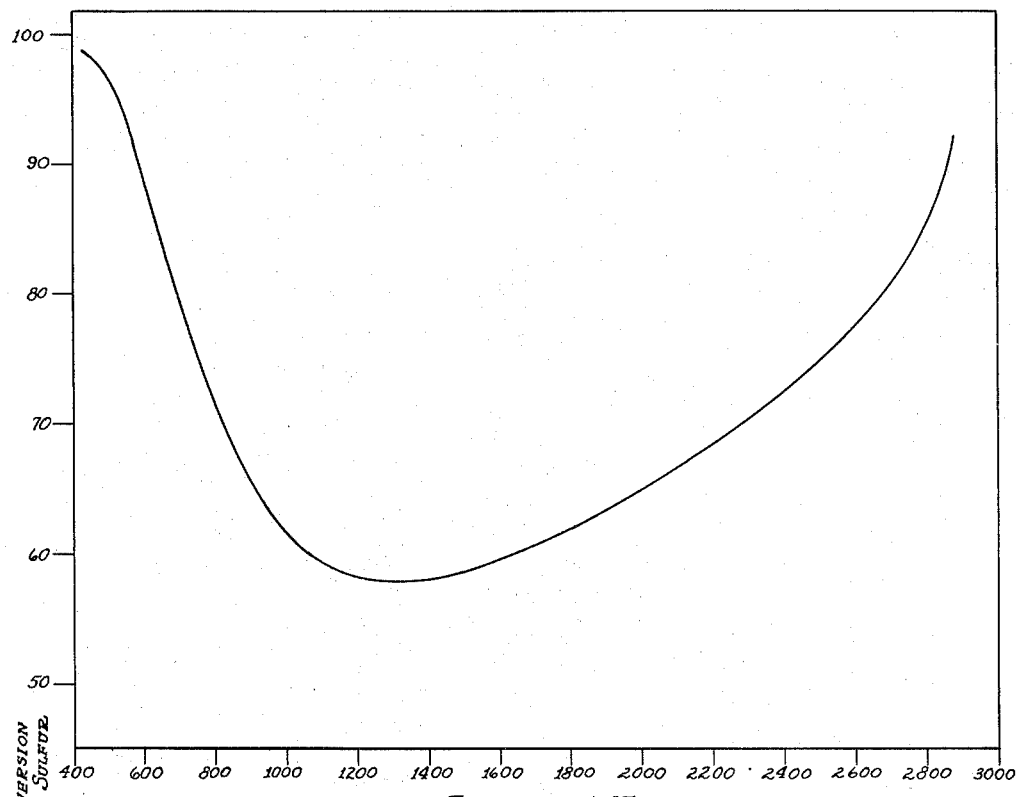

April 22, 1952  B. W. GAMSON  2,594,149

SULFUR RECOVERY

Filed March 5, 1948

INVENTOR.
BERNARD W. GAMSON
BY Lee J. Gary
ATTORNEY

UNITED STATES PATENT OFFICE 2,594,149

SULFUR RECOVERY

Bernard W. Gamson, Chicago, Ill., assignor to Great Lakes Carbon Corporation, Morton Grove, Ill., a corporation of Delaware Application March 5, 1948, Serial No. 13,179

3 Claims. (Cl. 23—225)

This invention relates to a process for converting hydrogen sulfide into elemental sulfur under conditions to produce high yields approaching the equilibrium value at the combustion temperature.

The reaction between oxygen and hydrogen sulfide to produce elemental sulfur has been known and widely used for many years. Under conditions normally employed and disclosed by the prior art, yields up to about 70% of the stoichiometrical have been obtained by direct combustion of hydrogen sulfide and air. The reaction is accompanied by the evolution of large amounts of heat and it has been the practice to employ coolers such as waste heat boilers, etc., in order to reduce the temperature and to make use of the heat liberated. Because of the comparatively low yields, namely up to about 70% of the stoichiometrical, the single step combustion of hydrogen sulfide to sulfur has not been considered practical, partly because of the waste of hydrogen sulfide remaining unconverted and partly because the disposal of such gases has presented something of a problem. Various expedients for improving the yields have been resorted to including the familiar Claus process in which the reaction is carried out in the presence of a suitable catalyst; and including a variation of the Claus process in which the gas containing both sulfur and hydrogen sulfide resulting from non-catalytic combustion is passed over a catalyst to complete the conversion at a lower temperature. It has also been suggested that a part of the sulfur formed in the initial non-catalytic combustion step be separated and that the residual gases containing oxygen, hydrogen sulfide, some free sulfur and sulfur dioxide, are passed over a catalyst. Because of the large amount of heat generated and because of the relatively large amounts of unconverted hydrogen sulfide remaining in the gas it has generally been necessary to resort to cooling of the catalyst gases and to use large beds of catalyst in order to keep the temperature down. Thus, a plant of a given capacity even for cleaning up the partially burned gas is a large and expensive apparatus.

In a broad embodiment the present invention comprises a process for converting hydrogen sulfide to free sulfur at a flame temperature above about 2400° F., and rapidly cooling the combustion products to a temperature below 900° F. to recover elemental sulfur in excess of 75% of the stoichiometrical.

In the accompanying drawing the figure illustrates the equilibrium relationship obtained at different temperatures in the system wherein hydrogen sulfide is burned with enough oxygen to correspond to the stoichiometric equation given below.

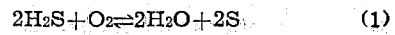
$$2H_2S + O_2 \rightleftharpoons 2H_2O + 2S \quad (1)$$

This reaction is reversible and proceeds according to Equation 2 under actual combustion conditions.

$$2H_2S + SO_2 \rightleftharpoons 2H_2O + 3S \quad (2)$$

Conversions of hydrogen sulfide to free sulfur in the neighborhood of 75 to 90% of the theoretical can be obtained at temperatures of above 2400° F. etc.

Under the conditions of operation as heretofore described, i. e., 1200–2000° F., the maximum possible yields obtainable are in the neighborhood of 58% to 70%. Heretofore, the combustion gases have been cooled relatively slowly in order to recover the waste heat, or the combustion was carried out at a low temperature so that low yields were obtained.

The kinetics of the reaction at temperatures below about 900° F. are such that sulfur is not produced thermally at a practical rate. By use of a suitable catalyts the reaction can be speeded up to a practical rate.

I have discovered that by rapid cooling of the high temperature combustion products from the combustion temperature in the neighborhood of 2400–3000° F. or higher, the high yields of sulfur produced at the high temperature are recoverable at yields approaching the equilibrium value at the combustion temperature.

Cooling can be accomplished by injecting a predetermined quantity of water into the gases, the amount being adjusted so that the temperature of the gases is lowered principally because of the heat of vaporization of water, from the temperature of combustion in the range above 2400° F. to a temperature below about 900° F. The rate should be greater than 20° F. per second and preferably above about 200° F. per second. Quenching from 2700° F. to 900° F. at rates of 20° F. per second produces about 72% sulfur recoverable, while at 200° F. per second 82% of sulfur is recoverable. At 50° F. per second the yield was 75%. At 500° F. per second 85% of sulfur is obtainable. At 1000° F. per second, 88% sulfur is recoverable. Increase of the rate above this does not seem to greatly improve recoveries.

The final temperature, however, must be kept above the melting point of the elemental sulfur and is preferably in the range of about 270–310°

F. This temperature is sufficiently high so that the steam produced by the vaporization of water will not condense, and the liquid sulfur may be withdrawn from the system. Concurrent with injection of water the combined gas stream may be passed through a waste heat boiler. Under these conditions about 90% of the waste heat can be recovered that it would be possible to recover in prior art H₂S combustion methods using lower temperatures by slow cooling of the combustion gases. This minor loss of heat, however, is more than compensated for by the increased yields of elemental sulfur that are obtained.

Thus, in actual practice I have recovered 75 to 85% of the stoichiometrical amount of sulfur that can be produced by the reaction of hydrogen sulfide and oxygen, the exact value depending in part upon the temperature of combustion and in part upon the rate of cooling, which is critical.

The combustion is carried out generally by mixing air and a gas containing hydrogen sulfide in a suitable type of burner. The combustion is generally carried out in a combustion zone which is preferably insulated in order to prevent loss of heat and contains no packing. In this way, high combustion temperatures may be obtained. Many gases containing hydrogen sulfide contain hydrocarbons as an incidental impurity which aids in keeping the temperature in the high range desired. Additional hydrocarbon can be added where necessary to reach the high temperature, especially when the concentration of hydrogen sulfide is low. The amount of air employed is sufficient to burn the hydrogen sulfide to sulfur and to burn other combustible materials such as hydrocarbons to carbon dioxide and water. The proportion of air should be kept below that which will result in substantial formation of sulfur dioxide according to the reaction

$$2H_2S + 3O_2 \rightarrow 2H_2O + 2SO_2 \quad (3)$$

The hydrogen sulfide gas may be obtained from any source and is preferably one which is rich in hydrogen sulfide. For example, the concentrated hydrogen sulfide containing gases produced by the various processes employed in the petroleum and natural gas industry to purify petroleum liquids and gases, may be used. These include concentrates from processes using aqueous solutions of triethanolamine, trisodium phosphate, etc.; also gases obtained by the stabilization of petroleum products such as crude oil, gasoline, etc.; the sour gases from natural gasoline plants; the hydrogen sulfide containing gases produced by roasting sulfide ores, etc.

Condensers or heat exchangers employing indirect heat exchange may be used. These must provide suitable structure to provide cooling surfaces and heat transfer rates to give the rates of cooling above referred to. The rate of flow of vapors therethrough should be such that the rate of cooling is as high as possible.

A cool gas, for example the cooled effluent process gases from which the sulfur has been separated, may be recycled and injected into the transfer line from the combustion zone to cool, or assist in cooling.

A quenching liquid may be used which has a high heat of vaporization; is non-reactive with sulfur bearing gas; is thermally stable at the temperatures used; boils below about 110° C.; and, unless water is used, is recoverable for reuse. Because of the undesirable displacement of the reaction toward the left of the Equation 2, only limited amounts of water can be employed, but it is possible to obtain part of the cooling in this way, providing that cooling by other means is simultaneously used. For example, a combination with indirect heat exchange can be used; or use of cooling gas; or both. Thus sulfur recoveries approaching 75 to 90% of the stoichiometrical and at values approaching the equilibrium value of high temperature combustion are obtained. This, in itself, is unpredictable.

Reduction of the temperature below about 290° F. is to be avoided in order to avoid formation of sulfur slurries in water as well as reduce the amount of corrosion which accompanies contact of metal and other surfaces with aqueous solutions of sulfur dioxide, and other sulfur containing acids.

Figure 2:
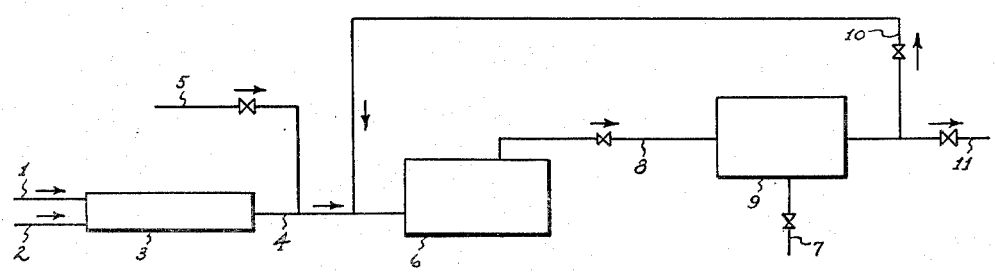

A preferred process flow is shown in Figure 2.

Air is introduced through line 1 and hydrogen sulfide through line 2 into combustion zone 3. Combustion of the hydroen sulfide to free sulfur occurs at a temperature in the neighborhood of 1000-3000° F. At our preferred conditions this is 2000-3000° F. This zone is insulated to prevent cooling. The effluent gases pass through line 4 in which they may be mixed with a quench liquid from line 5. When the quench liquid is used, the amount should be sufficient when taken with the cooling in zone 6 to reduce the temperature rapidly as above described, to about 500° to about 900° F. The effluent vapors pass to cooling zone 9 and are cooled, if desired, at a slower rate, to 290-350° F. The primary cooler may be a waste heat boiler. The second step may comprise a waste heat boiler by which some additional cooling and heat recovery is obtained. Liquid sulfur is withdrawn through line 7 to storage and if desired a part of the effluent gases may be recycled through line 10 to line 4. The remainder of the effluent gases may be passed through line 11. These gases may be discharged providing it is not desired to recover any residual sulfur contained therein; or they may be passed to a second treatment such as that described in my copending application, Serial Number 13,180, filed concurrently herewith, now abandoned, or may be treated by the well known Claus process to convert the remaining portion of the hydrogen sulfide to free sulfur. The present process is particularly advantageous when employed with the Claus process because the amount of sulfur bearing gases remaining in the effluent gas after this combustion is comparatively low and it is possible to conduct a catalytic operation in an adiabatic reactor of moderate size without obtaining unduly high temperatures. This means that the capital expenditure for catalyst cases is reduced in a plant employing the combined process.

The following example is given to illustrate the process but should not be construed as limiting the invention to exactly the conditions described therein.

A gas containing 91% hydrogen sulfide and 9% hydrocarbon containing 5% methane and 4% ethane, was mixed with the stoichiometric amount of air to burn the H₂S to sulfur and water, and the hydrocarbon to CO₂ and water. The mixture was burned in an insulated combustion zone. The temperature was 3000° F. It was cooled at a rate of about 500° F. per second to 850° F., and then at a slower rate of about 20° F. per second to 300° F. The liquid sulfur was separated and was found to amount to 87% of the stoichiometrical, based on hydrogen sulfide content of the original gas.

I claim as my invention:

1. A process for producing elemental sulfur by the non-catalytic combustion of hydrogen sulfide, which comprises forming a mixture of hydrogen sulfide and an oxygen-containing gas having about the stoichiometrical amount of oxygen for the reaction $$2H_2S + O_2 \rightarrow 2H_2O + 2S$$

burning said hydrogen sulfide at a temperature above 2400° F., cooling the combustion gases to a temperature below about 900° F. at a rate above 200° F. per second, and recovering sulfur in excess of 75% of the stoichiometrical yield.

2. A process for producing elemental sulfur by the non-catalytic combustion of hydrogen sulfide, which comprises forming a mixture of hydrogen sulfide and an oxygen-containing gas having about the stoichiometrical amount of oxygen for the reaction $$2H_2S + O_2 \rightarrow 2H_2O + 2S$$

burning said hydrogen sulfide at a temperature above 2400° F., cooling the combustion gases to a temperature below 900° F. at a rate above 200° F. per second by injecting therein a predetermined quantity of a vaporizable quench liquid under conditions to vaporize said liquid, and recovering sulfur in excess of 75% of the stoichiometrical yield.

3. A process for producing elemental sulfur by the non-catalytic combustion of hydrogen sulfide, which comprises forming a mixture of hydrogen sulfide and an oxygen-containing gas having about the stoichiometrical amount of oxygen for the reaction $$2H_2S + O_2 \rightarrow 2H_2O + 2S$$

burning said hydrogen sulfide at a temperature above 2400° F., cooling the combustion gases to a temperature below about 900° F. at a rate above 200° F. per second, said cooling being effected by simultaneous direct and indirect heat exchange, using a vaporizable fluid as the direct heat exchange medium under conditions to vaporize said fluid, and recovering sulfur in excess of 75% of the stoichiometrical yield

BERNARD W. GAMSON.

REFERENCES CITED

The following references are of record in the file of this patent:

UNITED STATES PATENTS

| Number | Name | Date |
|---|---|---|
| 2,403,451 | Nevins et al. | July 9, 1946 |
| 2,413,714 | Keeling | Jan. 7, 1947 |

FOREIGN PATENTS

| Number | Country | Date |
|---|---|---|
| 474,191 | Great Britain | Oct. 27, 1937 |

OTHER REFERENCES

Ser. No. 398,346, Koppers (A. P. C.), pub. April 27, 1943.